(12) United States Patent
Tanaka et al.

(10) Patent No.: US 7,418,047 B2
(45) Date of Patent: Aug. 26, 2008

(54) COMMUNICATION APPARATUS USING A PLURALITY OF MODULATION SCHEMES AND TRANSMISSION APPARATUS COMPOSING SUCH COMMUNICATION APPARATUS

(75) Inventors: Koichiro Tanaka, Takaraduka (JP); Hitoshi Takai, Toyono-gun (JP); Kenichi Mori, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 556 days.

(21) Appl. No.: 11/063,892

(22) Filed: Feb. 23, 2005

(65) Prior Publication Data
US 2005/0185727 A1      Aug. 25, 2005

(30) Foreign Application Priority Data
Feb. 25, 2004   (JP)   ............................. 2004-049649

(51) Int. Cl.
   *H04K 1/10*   (2006.01)
(52) U.S. Cl. .................. 375/260; 375/259; 375/261; 375/268; 375/279; 455/59; 370/341
(58) Field of Classification Search ............. 375/261, 375/259, 268, 279
   See application file for complete search history.

(56) References Cited

U.S. PATENT DOCUMENTS

| | | | |
|---|---|---|---|
| 6,807,221 B1 * | 10/2004 | Kim et al. ................. | 375/140 |
| 6,965,639 B2 * | 11/2005 | Uesugi ........................ | 375/225 |
| 7,069,489 B2 * | 6/2006 | Murakami et al. ........... | 714/746 |
| 7,187,716 B2 * | 3/2007 | Inoue ......................... | 375/259 |
| 7,210,202 B2 * | 5/2007 | Hamada ...................... | 24/433 |
| 2003/0157888 A1 | 8/2003 | Inoue | |
| 2004/0071079 A1 * | 4/2004 | Han ........................... | 370/210 |

FOREIGN PATENT DOCUMENTS

JP     2003-244260     8/2003

* cited by examiner

*Primary Examiner*—Shuwang Liu
*Assistant Examiner*—Kenneth Lam
(74) *Attorney, Agent, or Firm*—Wenderoth, Lind & Ponack, L.L.P.

(57) ABSTRACT

A first signal generation section 11 generates a baseband modulation signal for an ASK modulation scheme from transmission data. A second signal generation section 12 generates a pair of baseband modulation signals for a non-ASK modulation scheme from transmission data. When performing non-ASK modulation, a switch 15 connects between an input terminal d and an output terminal and outputs the baseband modulation signals based on the non-ASK modulation. When performing ASK modulation such that the transmission power ratio of the ASK modulation scheme to the non-ASK modulation scheme is a factor of 1, a switch 14 connects between an input terminal b and an output terminal and the switch 15 connects between an input terminal c and the output terminal. When performing ASK modulation such that the transmission power ratio is a factor of 2, the switch 14 connects between an input terminal a and the output terminal and the switch 15 connects between the input terminal c and the output terminal.

11 Claims, 11 Drawing Sheets

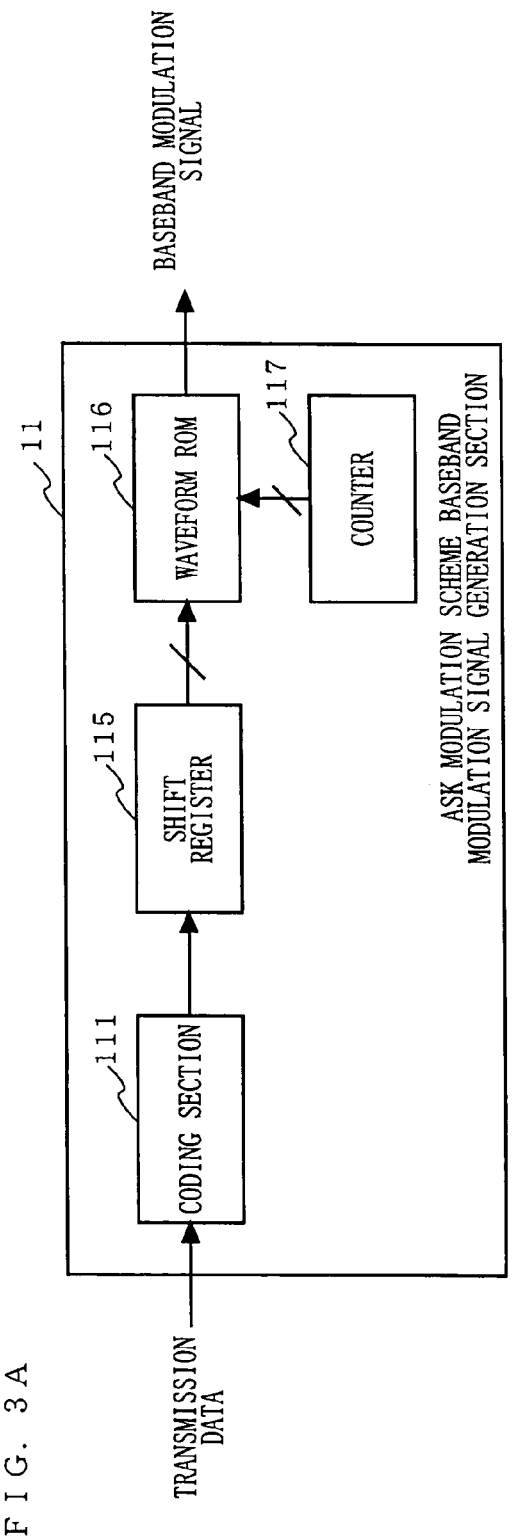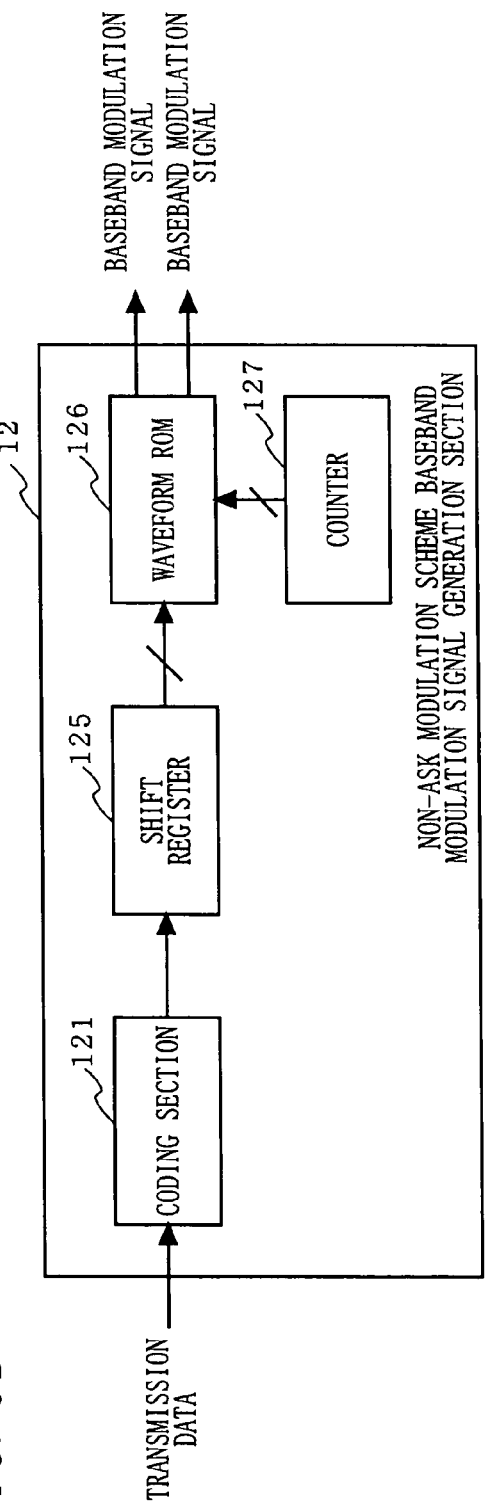

| MODULATION SCHEME | ASK POWER RATIO | POWER RATIO SWITCH | MODULATION SCHEME SWITCH |
|---|---|---|---|
| ASK | 1 | b | c |
| | 2 | a | c |
| NON-ASK | | — | d |

FIG. 7

| MODULATION SCHEME | ASK POWER RATIO | POWER RATIO SWITCH | MODULATION SCHEME SWITCH |
|---|---|---|---|
| ASK | 1 | b | c |
| | 2 | a | c |
| NON-ASK | | b | d |

F I G. 9

| MODULATION SCHEME | ASK POWER RATIO | POWER RATIO SWITCH | MODULATION SCHEME SWITCH |
|---|---|---|---|
| ASK | 1 | a | c |
| | 2 | b | c |
| NON-ASK | | b | d |

COMMUNICATION APPARATUS USING A PLURALITY OF MODULATION SCHEMES AND TRANSMISSION APPARATUS COMPOSING SUCH COMMUNICATION APPARATUS

BACKGROUND OF THE INVENTION

1. Field of the Invention

The present invention relates to a communication apparatus. In particular, the present invention relates to a communication apparatus capable of selecting either an ASK (or BPSK) modulation scheme or a non-ASK (or non-BPSK) modulation scheme and transmitting a modulated signal.

2. Description of the Background Art

Generally, in the case where communication is performed using a modulated signal, the modulation scheme may be selected according to the condition of a transmission path or the amount of data to be transmitted. For example, in a DSRC (Dedicated Short-Range Communication) system used in Intelligent Transport Systems, ASK and QPSK modulation schemes can be used.

FIG. 12 is a diagram showing an exemplary conventional communication apparatus capable of selecting a modulation scheme. In the conventional communication apparatus, in either case of ASK or QPSK modulation, a modulated high-frequency signal is obtained by multiplying a band-limited baseband signal by a high-frequency signal (see, for example, US Patent Publication No. US2003/0157888A1 (FIG. 5); the corresponding parent application is Japanese Laid-Open Patent Publication No. 2003-244260).

In FIG. 12, the conventional communication apparatus includes an ASK data generation section 201, a QPSK data generation section 202, a data selection section 203, low-pass filter sections 204 and 205, a quadrature modulation section 206, a signal source 207, a high-frequency power amplification section 208, and a transmission antenna 209. Note that although there is no specific description of the data selection section 203 in the drawing of the aforementioned patent publication, the data selection section 203 is additionally described because it is essential to provide an element which prevents collisions between the output of the ASK data generation section 201 and the output of the QPSK data generation section 202.

The ASK data generation section 201 generates a piece of ASK data from predetermined data. The QPSK data generation section 202 generates pieces of QPSK data in a pair from predetermined data. The data selection section 203 is a switch which has two input terminals each having two terminals in a pair and one output terminal having two terminals in a pair, and which controls the connection switching between the input terminals and the output terminal based on a modulation scheme designation signal. In the example of FIG. 12, the piece of data outputted from the ASK data generation section 201 and a piece of data having a value of 0 are inputted as a pair to one of the input terminals (input 1), and the pieces of data in a pair outputted from the QPSK data generation section 202 are inputted to the other input terminal (input 2). The low-pass filter sections 204 and 205 remove high-frequency components from pieces of data in a pair outputted from the data selection section 203, respectively, and output the resulting pieces of data as baseband modulation signals. The quadrature modulation section 206 performs a frequency conversion on the baseband modulation signals outputted from the low-pass filter sections 204 and 205 using a signal generated by the signal source 207, and then outputs a high-frequency signal modulated using ASK or QPSK. The high-frequency power amplification section 208 amplifies the high-frequency signal modulated by the quadrature modulation section 206 and radiates the resulting signal from the transmission antenna 209.

In the case of performing ASK modulation, a modulation scheme designation signal designating an ASK modulation scheme is provided to the data selection section 203. In response to this, the data selection section 203 switches the connection to the input 1 and the output terminal, and outputs a single-axis baseband modulation signal outputted from the ASK data generation section 201 and a signal having a value of 0, to the low-pass filter sections 204 and 205.

In the case of performing QPSK modulation, a modulation scheme designation signal designating a QPSK modulation scheme is provided to the data selection section 203. In response to this, the data selection section 203 switches the connection to the input 2 and the output terminal, and outputs baseband modulation signals in a pair outputted from the QPSK data generation section 202, to the low-pass filter sections 204 and 205.

Now, the relationship between the selecting of modulation schemes (ASK/QPSK) and the transmission power outputted from the high-frequency power amplification section 208 will be described. The transmission power is determined by the power of a high-frequency signal outputted from the quadrature modulation section 206 and the gain of the high-frequency power amplification section 208. The power of the high-frequency signal outputted from the quadrature modulation section 206 is determined, in the case of performing ASK modulation, by the amplitude of data outputted from the ASK data generation section 201 and the coefficients of the low-pass filter sections 204 and 205, and determined, in the case of performing QPSK modulation, by the amplitude of data outputted from the QPSK data generation section 202 and the coefficients of the low-pass filter sections 204 and 205. Therefore, the ratio of the transmission power outputted from the high-frequency power amplification section 208 when performing ASK modulation to the transmission power outputted from the high-frequency power amplification section 208 when performing QPSK modulation has a fixed value which is determined by the design.

A communication system is normally composed of a plurality of communication apparatuses. The communication apparatuses have different factors of importance depending on the type thereof. For example, in the case where the communication apparatus is configured as a base station for a wireless communication system, since the communication apparatus exerts a great influence on the operation of the entire system, importance is placed on reducing transmission errors. In the case where the communication apparatus is configured as a mobile terminal, since the communication apparatus is owned by general users, importance is placed on reducing costs.

Of the elements composing the communication apparatus, a high-frequency power amplification section is one of those elements that place importance on both reducing transmission errors and reducing costs. In the communication apparatus placing importance on reducing transmission errors, it is desirable to select a high-frequency power amplification section capable of outputting a high power. On the other hand, in the communication apparatus placing importance on reducing costs, it is desirable to select a low-cost high-frequency power amplification section even if its maximum possible output power is somewhat low. In selecting a high-frequency power amplification section, it should be noted that the maximum possible output power varies with the modulation scheme.

The high-frequency power amplification section will be described using a DSRC system as an example. According to the standard for the DRSC system, it is specified that in the base station and mobile terminal of class 1, the upper limit of transmission power is 10 mW in both cases of ASK modulation and π/4 shift QPSK (hereinafter referred to as "QPSK") modulation. The transmission power is defined as the peak value of the antenna power in the case of ASK modulation, and is defined as the average value of the antenna power in the case of QPSK modulation. However, in a low-cost high-frequency power amplification section designed to output a peak value of 10 mW when performing ASK modulation, such an amplification section can only output an average value of the order of 5 mW when performing QPSK modulation.

In the communication apparatus placing importance on reducing transmission errors, since there is a constraint that the sensitivity of a cost-conscious communication apparatus with which it communicates is not so good, it is desirable to select a high-frequency power amplification section capable of outputting a power of 10 mW when performing QPSK modulation. Therefore, it is desirable that the transmission power in the case of performing ASK/QPSK modulation be 10 mW/10 mW which is the upper limit specified in the standard. On the other hand, in the communication apparatus placing importance on reducing costs, it is desirable to select a low-cost high-frequency power amplification section, though the output power in the case of performing QPSK modulation is on the order of 5 mW. Therefore, it is desirable that the transmission power in the case of performing ASK/QPSK modulation be 10 mW/5 mW.

Namely, the ratio of the transmission power outputted from the high-frequency power amplification section when performing ASK modulation to the transmission power outputted from the high-frequency power amplification section when performing QPSK modulation varies with the type of communication apparatus.

In the conventional communication apparatus, however, the ratio of the transmission power outputted from the high-frequency power amplification section when performing ASK modulation to the transmission power outputted from the high-frequency power amplification section when performing QPSK modulation has a fixed value which is determined by the design of the data generation sections and the low-pass filter sections. Accordingly, there is a need to provide plural types of data generation sections or low-pass filter sections depending on the type of communication apparatus, which makes it impossible to sufficiently enjoy cost-reduction advantages resulting from mass production.

In the case where data generation sections and low-pass filter sections which are not suitable for the type of a given communication apparatus are used, there is a need to provide an expensive high-frequency power amplification section. For example, the case is described where a communication apparatus placing importance on reducing costs uses data generation sections and low-pass filter sections which are designed such that the transmission power ratio when performing ASK/QPSK modulation is "1". In this case, if a low-cost high-frequency power amplification section is used, the transmission power is 5 mW not only when performing QPSK modulation but also when performing ASK modulation, causing a problem in transmission reliability. That is, a low-cost high-frequency power amplification section cannot be used.

In order that one communication apparatus realizes two different transmission power ratios in ASK/QPSK modulation, i.e., 10 mW/10 mW=1 and 10 mW/5 mW=2, normally, the communication apparatus requires the following configuration (A) or (B).

(A) A multiplier for amplifying amplitude by a factor of $\sqrt{2}$ is provided at any point before the quadrature modulation section 206 of FIG. 12. In this configuration, there is a need to handle the number "about 1.4 times" with which, when numbers are represented in binary format, the number of binary digits gets large, and as a result, the size of hardware for digital signal processing increases, causing an increase in costs.

(B) A variable attenuator or a gain-variable amplifier is provided to the input of the high-frequency power amplification section 208 of FIG. 12. In this configuration, the addition of a high-frequency element degrades the stability of transmission power and increases costs.

SUMMARY OF THE INVENTION

Therefore, an object of the present invention is to provide, in the case where plural types of communication apparatuses having different transmission power settings are present in a communication system using a plurality of modulation schemes, a communication apparatus which achieves a reduction in costs and circuit commonality without additionally providing a special configuration or degrading the stability of transmission power.

The present invention is directed to a communication apparatus for performing data communication by selectively using a single-axis modulation scheme including an ASK modulation scheme and a BPSK modulation scheme, and a two-axis modulation scheme including a non-ASK modulation scheme and a non-BPSK modulation scheme, and to a transmission apparatus composing such a communication apparatus. To attain the object mentioned above, the transmission apparatus of the present invention comprises first and second signal generation sections, a modulation scheme selection section, a quadrature modulation section, and a high-frequency power amplification section.

The first signal generation section is operable to generate a baseband modulation signal for the signal-axis modulation scheme. The second signal generation section is operable to generate a pair of baseband modulation signals for the two-axis modulation scheme. The modulation scheme selection section is operable to select, when performing two-axis modulation, the pair of baseband modulation signals generated by the second signal generation section, and select, when performing single-axis modulation, either a pair of signals including the baseband modulation signal generated by the first signal generation section and a signal having a fixed value, or a pair of signals into which the baseband modulation signal generated by the first signal generation section is branched, according to transmission power. The quadrature modulation section is operable to perform a frequency conversion on the pair of signals selected by the modulation scheme selection section, and output a modulated high-frequency signal. The high-frequency power amplification section is operable to amplify the high-frequency signal modulated by the quadrature modulation section, and transmit the resulting signal from an antenna.

It is preferred that the modulation scheme selection section include: a power ratio switch for accepting as input the baseband modulation signal generated by the first signal generation section and the signal having a fixed value, and outputting one of the two signals based on a predetermined power ratio designation signal; and a modulation scheme switch for accepting as input a pair of signals including the baseband modulation signal generated by the first signal generation section and the signal outputted from the power ratio switch, and the pair of baseband modulation signals generated by the second signal generation section, and outputting one of the two pairs of signals based on a predetermined modulation scheme designation signal.

The modulation scheme selection section may include: a modulation scheme switch for accepting as input the pair of signals including the baseband modulation signal generated by the first signal generation section and the signal having a fixed value, and the pair of baseband modulation signals generated by the second signal generation section, and outputting one of the two pairs of signals based on a predetermined modulation scheme designation signal; and a power ratio switch for accepting as input the pair of signals outputted from the modulation scheme switch, and outputting, when performing the single-axis modulation, either the inputted pair of signals or a pair of signals into which the baseband modulation signal included in the inputted pair of signals is branched, according to a predetermined power ratio designation signal.

Alternatively, the modulation scheme selection section may include: a modulation scheme switch for accepting as input the pair of signals into which the baseband modulation signal generated by the first signal generation section is branched, and the pair of baseband modulation signals generated by the second signal generation section, and outputting one of the two pairs of signals based on a predetermined modulation scheme designation signal; and a power ratio switch for accepting as input the pair of signals outputted from the modulation scheme switch, and outputting, when performing the single-axis modulation, either the inputted pair of signals or a pair of signals such that one of the inputted pair of signals is the signal having a fixed value.

The processes performed by the elements of the above-described transmission apparatus can be taken as a transmission method which provides a series of process steps. The method may be provided in the form of a program which causes a computer to perform the series of process steps. The program may be stored on a computer from a computer-readable storage medium in which the program is stored. Part or all of the functional blocks composing the above-described transmission apparatus may be realized in the form of an LSI which is an integrated circuit.

As described above, according to the communication apparatus of the present invention, since the ratio of the transmission power in the case of performing ASK modulation to the transmission power in the case of performing non-ASK modulation can be changed according to the type of the communication apparatus, it is possible to select and mount a high-frequency power amplification section suitable in terms of cost for the type of the communication apparatus. In addition, since most of the elements other than the high-frequency power amplification section have commonality, cost reduction resulting from mass production is achieved.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3A is a diagram showing another exemplary configuration of the ASK modulation scheme baseband modulation signal generation section 11;

FIG. 3B is a diagram showing another exemplary configuration of the non-ASK modulation scheme baseband modulation signal generation section 12;

FIG. 7 is a diagram for describing a connection switching control performed by a modulation scheme selection section 23;

FIG. 9 is a diagram for describing a connection switching control performed by a modulation scheme selection section 33;

DESCRIPTION OF THE PREFERRED EMBODIMENTS

Single-axis modulation schemes applicable to a communication apparatus of the present invention include ASK and BPSK modulation schemes. In addition, modulation schemes to be standardized in the future can also be applied to the present invention as long as the scheme is a signal-axis modulation scheme.

The communication apparatus of the present invention will be described below using an example where the ASK modulation scheme is used as a single-axis modulation scheme and a non-ASK modulation scheme is used as a two-axis modulation scheme. The ASK modulation scheme includes a multi-level ASK modulation scheme. The non-ASK modulation scheme includes modulation schemes having phase modulation components, such as QPSK, QAM, and MSK.

First Embodiment

Figure 1:
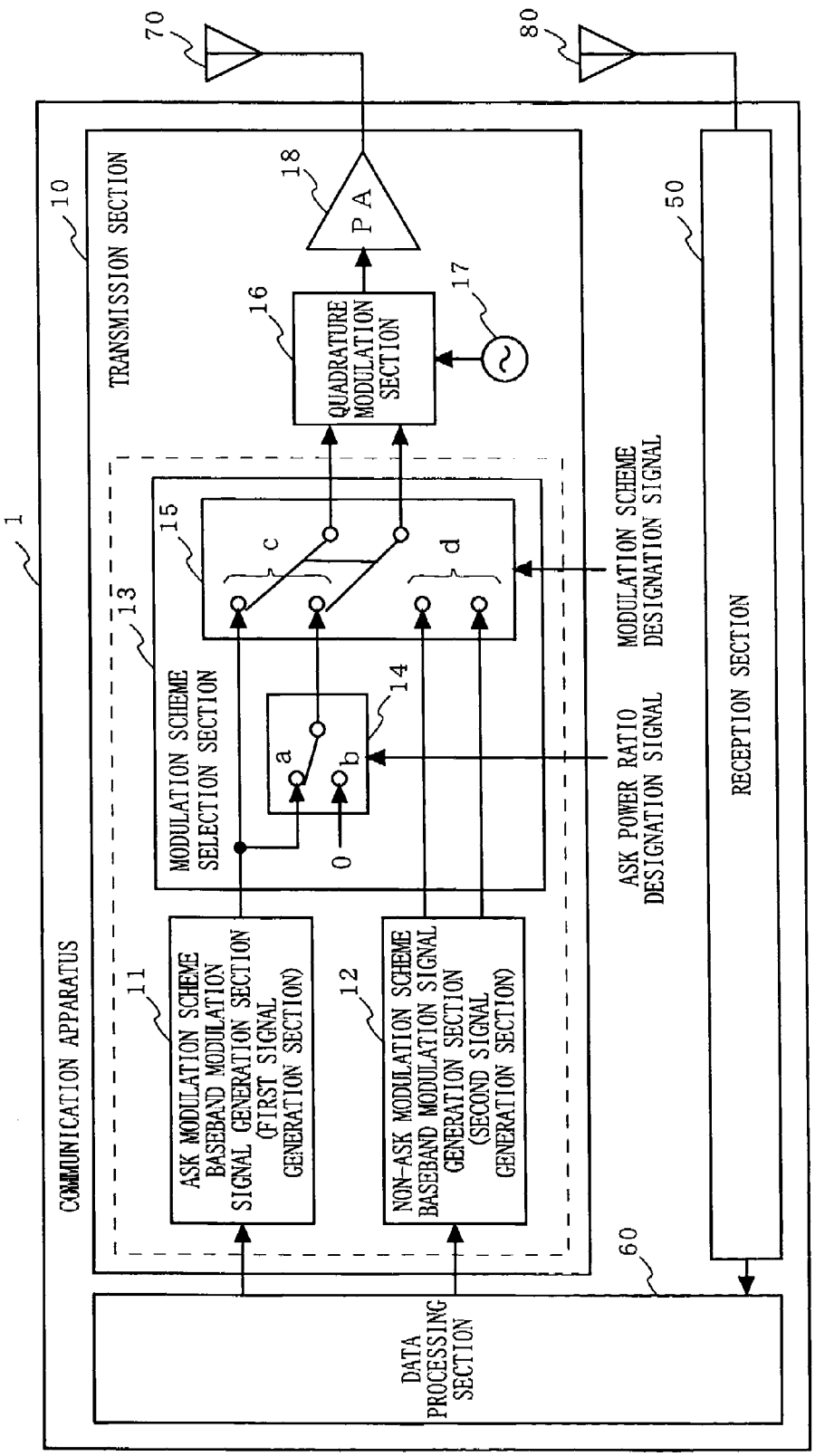
FIG. 1 is a block diagram showing a configuration of a communication apparatus 1 according to a first embodiment of the present invention.

FIG. 1 is a block diagram showing a configuration of a communication apparatus 1 according to a first embodiment of the present invention. In FIG. 1, the communication apparatus 1 according to the first embodiment includes a transmission section 10, a reception section 50, a data processing section 60, a transmission antenna 70, and a reception antenna 80. The reception section 50 performs a predetermined reception process on data received by the reception antenna 80. The data processing section 60 accepts as input the reception data from the reception section 50 and performs a predetermined process on the reception data, and then outputs transmission data resulting from the predetermined process to the transmission section 10. The transmission section 10 performs a predetermined transmission process on the transmission data outputted from the data processing section 60, and then sends out a resulting high-frequency signal from the transmission antenna 70. Note that the transmission antenna 70 and the reception antenna 80 may be combined as a single unit. In the case where the communication apparatus serves as a transmission apparatus having only a transmission function, neither of the reception section 50 nor of the reception antenna 80 is required.

The communication apparatus 1 of the present invention performs a modulation scheme switching process using characteristic elements in the transmission section 10 in the manner described below.

The transmission section 10 includes a first signal generation section 11, a second signal generation section 12, a modulation scheme selection section 13, a quadrature modulation section 16, a signal source 17, and a high-frequency power amplification section (PA) 18. In the example where the ASK modulation scheme is used, the first signal generation section 11 serves as an ASK modulation scheme baseband modulation signal generation section 11 and the second signal generation section 12 serves as a non-ASK modulation scheme baseband modulation signal generation section 12. The modulation scheme selection section 13 includes a power ratio switch 14 and a modulation scheme switch 15.

Figure 2A:
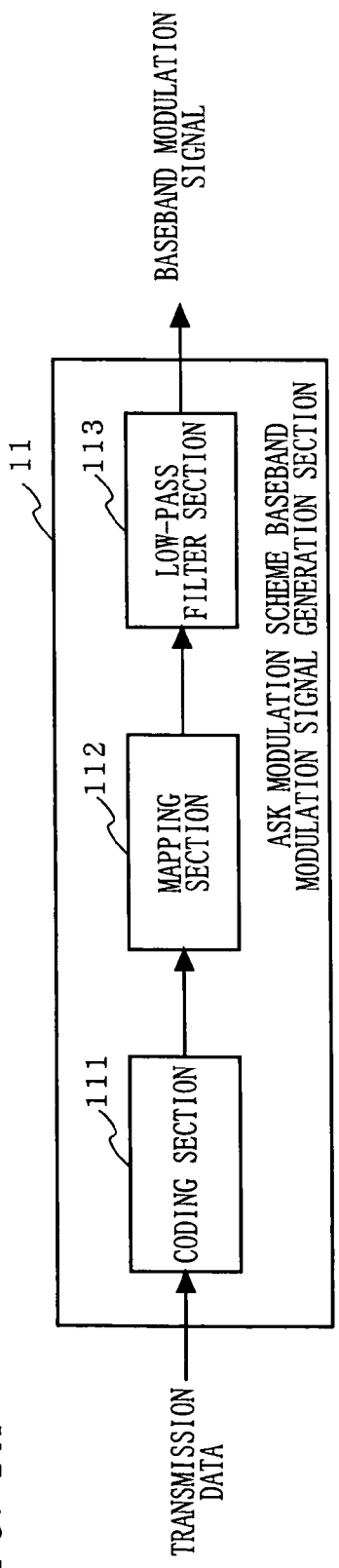
FIG. 2A is a diagram showing an exemplary configuration of an ASK modulation scheme baseband modulation signal generation section 11.

The ASK modulation scheme baseband modulation signal generation section 11 accepts, as input, transmission data from the data processing section 60 and generates a single-axis baseband modulation signal for ASK modulation scheme. FIGS. 2A and 3A are diagrams each showing an exemplary configuration of the ASK modulation scheme baseband modulation signal generation section 11. In the configuration shown in FIG. 2A, the transmission data is coded by a coding section 111, mapped by a mapping section 112 to a value according to the ASK modulation scheme, and thereafter passed through a low-pass filter section 113 and then is outputted as a band-limited baseband modulation signal. By configuring the ASK modulation scheme circuit separately from the non-ASK modulation scheme circuit, the calculation coefficients used by the mapping section 112 and the low-pass filter section 113 can be fixed values, making it possible to reduce the circuit size.

The configuration shown in FIG. 3A is such that the calculation results obtained using the mapping section 112 and the low-pass filter section 113 of FIG. 2A are pre-stored in a waveform ROM 116, and the calculation results are read from the waveform ROM 116 according to transmission data. It is known that by storing the waveforms of modulation symbols so as to correspond to data series representing the response duration of the low-pass filter section 113, a baseband modulation signal can be generated. Hence, in the configuration shown in FIG. 3A, the transmission data is coded by a coding section 111 and converted by a shift register 115 into data series of a predetermined length, and then fed to the waveform ROM 116. In the waveform ROM 116, the waveform corresponding to the data series is read according to the time in a modulation symbol provided by a counter 117, and the waveform is outputted as a baseband modulation signal. By configuring the ASK modulation scheme circuit separately from the non-ASK modulation scheme circuit, unnecessary storage capacity of the waveform ROM 116 is eliminated, making it possible to reduce the circuit size.

Figure 2B:
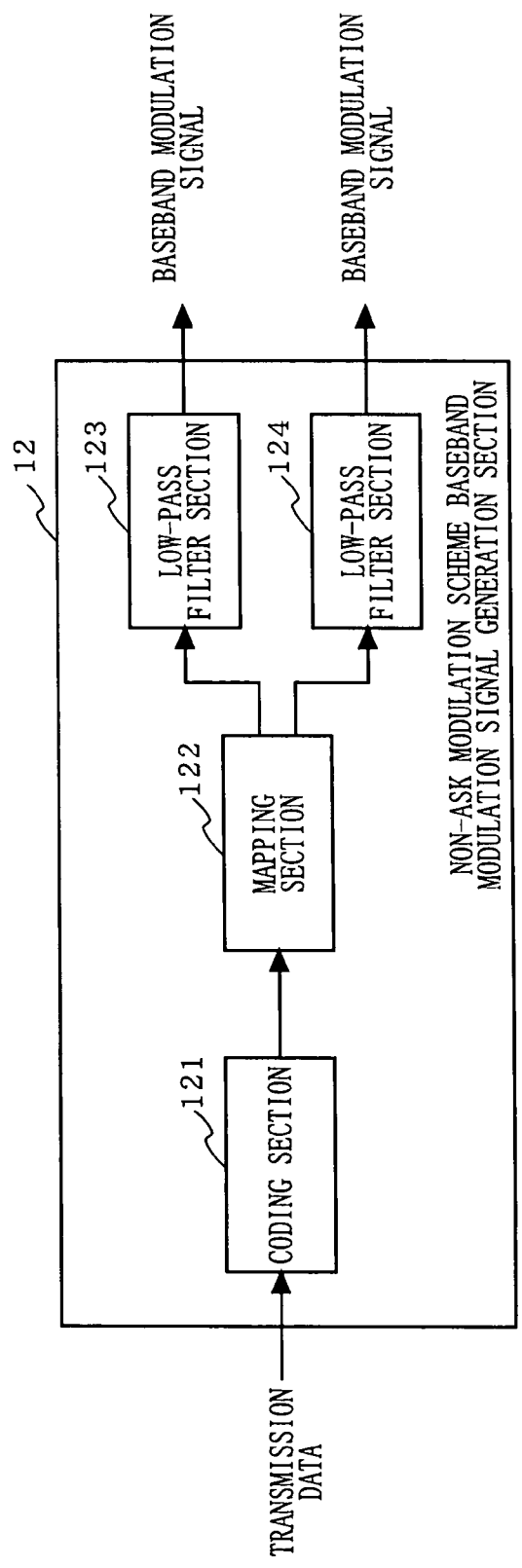
FIG. 2B is a diagram showing an exemplary configuration of a non-ASK modulation scheme baseband modulation signal generation section 12.

The non-ASK modulation scheme baseband modulation signal generation section 12 accepts, as input, transmission data from the data processing section 60 and generates a baseband modulation signal for any modulation scheme other than the ASK modulation scheme, in which two axes are made as a pair. FIGS. 2B and 3B are diagrams each showing an exemplary configuration of the non-ASK modulation scheme baseband modulation signal generation section 12. In the configuration shown in FIG. 2B, the transmission data is coded by a coding section 121, mapped by a mapping section 122 to values in a pair according to any modulation scheme other than the ASK modulation scheme, and thereafter passed through low-pass filter sections 123 and 124 and then is outputted as band-limited baseband modulation signals. By configuring the non-ASK modulation scheme circuit separately from the ASK modulation scheme circuit, the calculation coefficients used by the mapping section 122 and the low-pass filter sections 123 and 124 can be fixed values, making it possible to reduce the circuit size.

In the configuration shown in FIG. 3B, as with the configuration shown in FIG. 3A, the transmission data is coded by a coding section 121 and converted by a shift register 125 into data series of a predetermined length, and then fed to a waveform ROM 126. In the waveform ROM 126, the waveform corresponding to the data series is read according to the time of a modulation symbol provided by a counter 127, and the waveform is outputted as baseband modulation signals. By configuring the non-ASK modulation scheme circuit separately from the ASK modulation scheme circuit, unnecessary storage capacity of the waveform ROM 126 is eliminated, making it possible to reduce the circuit size.

The power ratio switch 14 has two input terminals and one output terminal, and controls the connection switching between the input terminals and the output terminal based on a designation signal. In the example of FIG. 1, the signal outputted from the ASK modulation scheme baseband modulation signal generation section 11 is inputted to an input terminal a, and a signal having a value of 0 is inputted to an input terminal b. A signal designating the ASK power ratio is fed, as a designation signal, to the power ratio switch 14. The designation of the ASK power ratio may be made electrically using, for example, a register in which data is recorded, or may be made mechanically using, for example, a switch to control the connection point thereof. The signal having a value of 0 to be inputted to the input terminal b means a signal having a fixed value which, when inputted to the quadrature modulation section 16, makes the amplitude of a high-frequency signal zero.

The modulation scheme switch 15 has two input terminals each having two terminals in a pair and one output terminal having two terminals in a pair, and controls the connection switching between the input terminals and the output terminal based on a designation signal. In the example of FIG. 1, the signal outputted from the ASK modulation scheme baseband modulation signal generation section 11 and the signal outputted from the power ratio switch 14 are inputted as a pair to an input terminal c. The signals in a pair outputted from the non-ASK modulation scheme baseband modulation signal generation section 12 are inputted to an input terminal d. A signal designating the modulation scheme is fed, as a designation signal, to the modulation scheme switch 15.

Figures 4, 5:
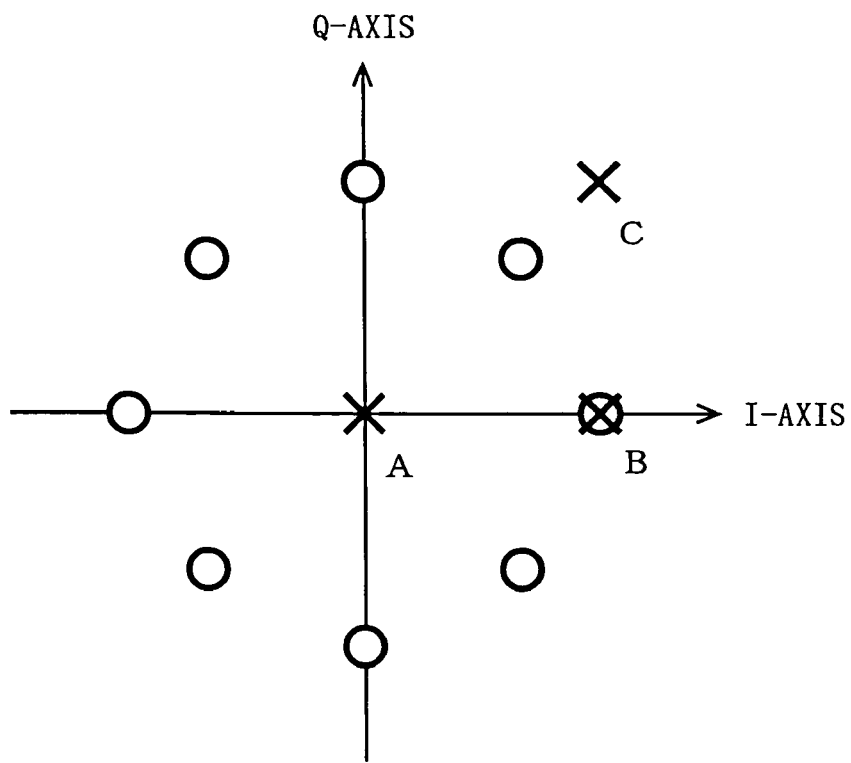
FIG. 4 is a diagram for describing a connection switching control performed by a modulation scheme selection section 13.
FIG. 5 is a signal space diagram for quadrature modulation (ASK and QPSK modulation schemes)

The modulation scheme selection section 13 controls connection switching such that the power ratio switch 14 and the modulation scheme switch 15 perform connection switching according to the modulation scheme and transmission power ratio to be applied to transmission data, using the combinations shown in FIG. 4. The modulation scheme is designated by a modulation scheme designation signal and the transmission power ratio is designated by an ASK power ratio designation signal. Note that the designation of the modulation scheme can be freely made according to the type of transmission data, a communication partner, a control signal received from the communication partner, or the like. Note also that although in many cases the designation of the transmission power ratio is fixed by the type of communication apparatus, the designation of the transmission power ratio may be dynamically changed.

(1) In the case of performing non-ASK modulation, a modulation scheme designation signal designating a non-ASK modulation scheme is provided to the modulation scheme switch 15. In response to this, the modulation scheme switch 15 switches the connection to the input terminal d and the output terminal, and outputs baseband modulation signals in a pair outputted from the non-ASK modulation scheme baseband modulation signal generation section 12, to the quadrature modulation section 16.

(2) In the case of performing ASK modulation such that the ratio of the transmission power in the ASK modulation scheme to the transmission power in the non-ASK modulation scheme is a factor of 1, an ASK power ratio designation signal designating an ASK power ratio of "1" is provided to the power ratio switch 14, and a modulation scheme designation signal designating the ASK modulation scheme is provided to the modulation scheme switch 15. In response to this, the power ratio switch 14 switches the connection to the input terminal b and the output terminal, and outputs a signal having a value of 0 to one of the terminals of the input terminal c in the modulation scheme switch 15. The modulation scheme switch 15 then switches the connection to the input terminal c and the output terminal, and outputs a single-axis baseband modulation signal outputted from the ASK modulation scheme baseband modulation signal generation section 11 and the signal having a value of 0, to the quadrature modulation section 16.

(3) In the case of performing ASK modulation such that the ratio of the transmission power in the ASK modulation scheme to the transmission power in the non-ASK modulation scheme is a factor of 2, an ASK power ratio designation signal designating an ASK power ratio of "2" is provided to the power ratio switch 14, and a modulation scheme designation signal designating the ASK modulation scheme is provided to the modulation scheme switch 15. In response to this, the power ratio switch 14 switches the connection to the input terminal a and the output terminal, and outputs a single-axis baseband modulation signal outputted from the ASK modulation scheme baseband modulation signal generation section 11, to one of the terminals of the input terminal c in the modulation scheme switch 15. The modulation scheme switch 15 then switches the connection to the input terminal c and the output terminal, and outputs to the quadrature modulation section 16 a pair of signals into which the single-axis baseband modulation signal outputted from the ASK modulation scheme baseband modulation signal generation section 11 is branched.

The quadrature modulation section 16 performs a frequency conversion on the base band modulation signals outputted from the modulation scheme switch 15 using a signal generated by the signal source 17, and then outputs a high-frequency signal modulated using ASK or non-ASK. The high-frequency power amplification section 18 amplifies the high-frequency signal modulated by the quadrature modulation section 16, and then radiates the resulting signal from the transmission antenna 70.

Using a DRSC system as an example, the transmission power will be described in the case where π/4 shift QPSK modulation (hereinafter referred to as "QPSK") is used as non-ASK modulation. FIG. 5 is an exemplary signal space diagram for quadrature modulation in the quadrature modulation section 16. The I-axis and the Q-axis represent the axes of baseband modulation signals in a pair, respectively.

In FIG. 5, the points indicated by the symbol "○" represent the signal points of QPSK and the points indicated by the symbol "X" represent the signal points of ASK. When the ASK power ratio designation is "1", since the I-axis input is an ASK modulation scheme baseband modulation signal and the Q-axis input is a signal having a value of 0, the signal points of ASK are the points indicated by the symbol "X" of A and the symbol "X" of B. On the other hand, when the ASK power ratio designation is "2", since both the I-axis input and the Q-axis input are a single ASK modulation scheme baseband modulation signal, the signal points of ASK are the points indicated by the symbol "X" of A and the symbol "X" of C. Comparing with the average amplitude of QPSK modulation (as indicated by the symbol "○"), the peak amplitude of ASK modulation (as indicated by the symbol "X") is higher by a factor of 1 when the ASK power ratio designation is "1", and by a factor of $\sqrt{2}$ when the ASK power ratio designation is "2".

As described above, according to the communication apparatus 1 of the first embodiment of the present invention, since the ratio of the transmission power in the case of performing ASK modulation to the transmission power in the case of performing non-ASK modulation can be changed according to the type of communication apparatus, it is possible to select and mount a high-frequency power amplification section suitable in terms of cost for the type of the communication apparatus. In addition, since most of the elements other than the high-frequency power amplification section have commonality, cost reduction resulting from mass production is achieved.

For example, when the ASK power ratio designation is "1", the transmission power in the case of performing ASK/QPSK modulation can be designed to be 10 mW/10 mW which is the upper limit specified in the standard, and thus by selecting a high-frequency power amplification section capable of outputting a power of 10 mW when performing QPSK modulation, a communication apparatus placing importance on reducing transmission errors can be realized. On the other hand, when the ASK power ratio designation is "2", the transmission power in the case of performing ASK/QPSK modulation can be designed to be 10 mW/5 mW, and thus by selecting a low-cost high-frequency power amplification section, a low-cost communication apparatus can be realized.

Note that the present embodiment describes that when the ratio of the transmission power in the ASK modulation scheme to the transmission power in the non-ASK modulation scheme is a factor of 1, an ASK power ratio of "1" is designated, and when the ratio is a factor of 2, an ASK power ratio of "2" is designated. However, this designation method is merely one example, and thus it is also possible to designate an ASK power ratio of "1" when the ratio has a given value which is determined based on the error rate characteristics at the time of communication, the realizability of the circuit, or the like, and designate an ASK power ratio of "2" when the ratio is double the given value.

Note also that in the present embodiment the modulation scheme switch is arranged immediately after the power ratio switch in the modulation scheme selection section. However, providing, for example, a D/A converter, a filter, a level conversion circuit, or the like between these switches falls within a normal range of design choices.

Second Embodiment

Figure 6:
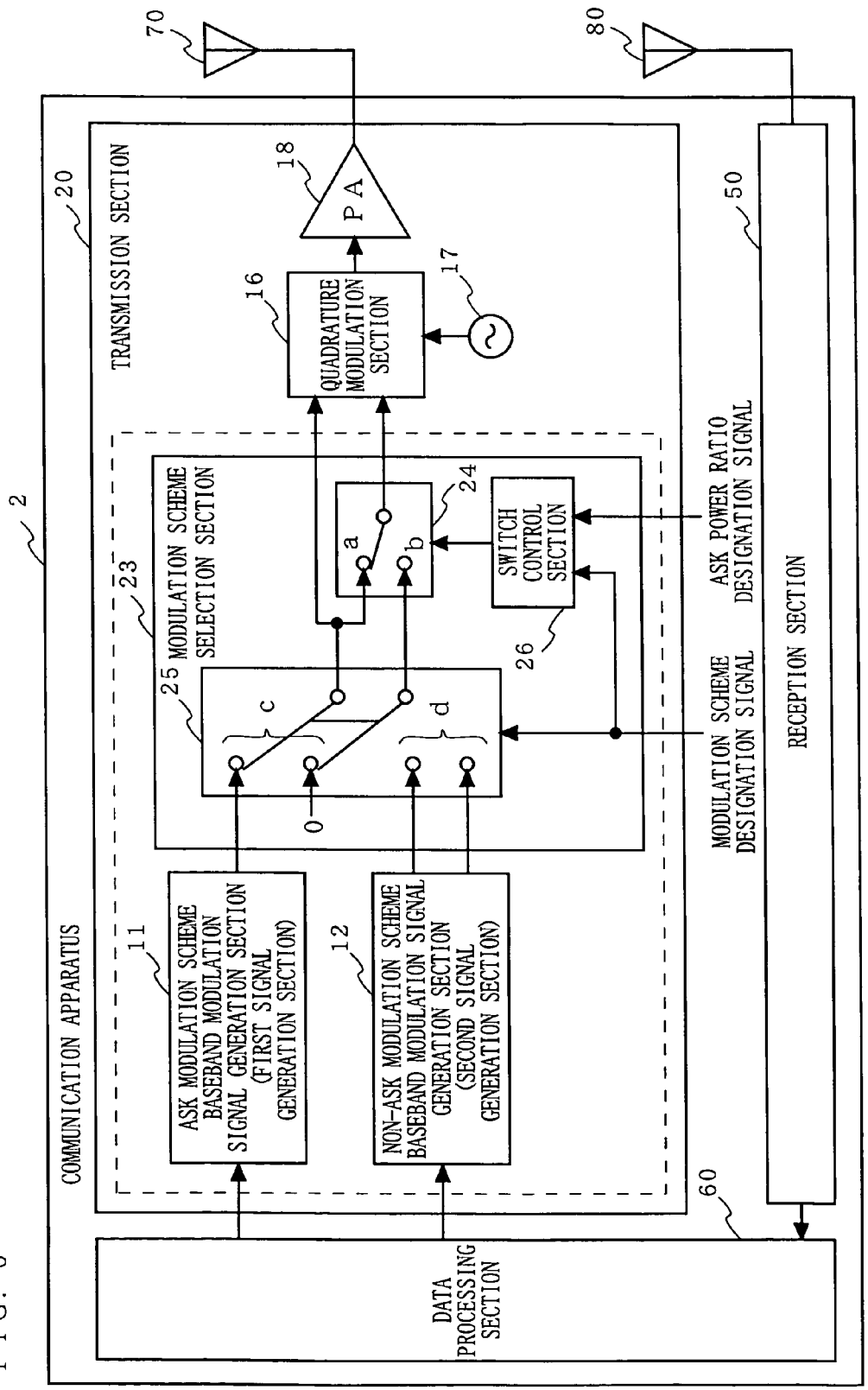
FIG. 6 is a block diagram showing a configuration of a communication apparatus 2 according to a second embodiment of the present invention.

FIG. 6 is a block diagram showing a configuration of a communication apparatus 2 according to a second embodiment of the present invention. In FIG. 6, the communication apparatus 2 according to the second embodiment includes a transmission section 20, a reception section 50, a data processing section 60, a transmission antenna 70, and a reception antenna 80. The transmission section 20 includes a first signal generation section 11, a second signal generation section 12, a modulation scheme selection section 23, a quadrature modulation section 16, a signal source 17, and a high-frequency power amplification section 18. The communication apparatus 2 according to the second embodiment differs from the communication apparatus 1 according to the foregoing first embodiment in the configuration of the modulation scheme selection section 23. The modulation scheme selection section 23 of a different configuration will be described below.

The modulation scheme selection section 23 includes a modulation scheme switch 25, a power ratio switch 24, and a switch control section 26. The modulation scheme switch 25 has two input terminals each having two terminals in a pair and one output terminal having two terminals in a pair, and controls the connection switching between the input terminals and the output terminal based on a modulation scheme designation signal. In the example of FIG. 6, a signal outputted from the ASK modulation scheme baseband modulation signal generation section 11 and a signal having a value of 0 are inputted as a pair to an input terminal c. A pair of signals outputted from the non-ASK modulation scheme baseband modulation signal generation section 12 are inputted to an input terminal d.

The switch control section 26 controls the connection switching of the power ratio switch 24 based on a modulation scheme designation signal and an ASK power ratio designation signal. The power ratio switch 24 has two input terminals and one output terminal, and controls the connection switching between the input terminals and the output terminal based on an instruction from the switch control section 26. In the example of FIG. 6, one of the signals in a pair outputted from the modulation scheme switch 25 is inputted to an input terminal a, and the other one of the signals in a pair is inputted to an input terminal b.

The modulation scheme selection section 23 controls connection switching such that the modulation scheme switch 25 and the power ratio switch 24 perform connection switching according to the modulation scheme and transmission power ratio to be applied to transmission data, using the combinations shown in FIG. 7.

(1) In the case of performing non-ASK modulation, a modulation scheme designation signal designating a non-ASK modulation scheme is provided to the modulation scheme switch 25 and the switch control section 26. In response to this, the modulation scheme switch 25 switches the connection to the input terminal d and the output terminal, and the switch control section 26 controls the power ratio switch 24 to switch the connection to the input terminal b and the output terminal. By this switching, baseband modulation signals in a pair outputted from the non-ASK modulation scheme baseband modulation signal generation section 12 are outputted to the quadrature modulation section 16.

(2) In the case of performing ASK modulation such that the ratio of the transmission power in the ASK modulation scheme to the transmission power in the non-ASK modulation scheme is a factor of 1, an ASK power ratio designation signal designating an ASK power ratio of "1" is provided to the switch control section 26, and a modulation scheme designation signal designating the ASK modulation scheme is provided to the modulation scheme switch 25 and the switch control section 26. In response to this, the modulation scheme switch 25 switches the connection to the input terminal c and the output terminal, and the switch control section 26 controls the power ratio switch 24 to switch the connection to the input terminal b and the output terminal. By this switching, a single-axis baseband modulation signal outputted from the ASK modulation scheme baseband modulation signal generation section 11 and a signal having a value of 0 are outputted to the quadrature modulation section 16.

(3) In the case of performing ASK modulation such that the ratio of the transmission power in the ASK modulation scheme to the transmission power in the non-ASK modulation scheme is a factor of 2, an ASK power ratio designation signal designating an ASK power ratio of "2" is provided to the switch control section 26, and a modulation scheme designation signal designating the ASK modulation scheme is provided to the modulation scheme switch 25 and the switch control section 26. In response to this, the modulation scheme switch 25 switches the connection to the input terminal c and the output terminal, and the switch control section 26 controls the power ratio switch 24 to switch the connection to the input terminal a and the output terminal. By this switching, a pair of signals into which a single-axis baseband modulation signal outputted from the ASK modulation scheme baseband modulation signal generation section 11 is branched, is outputted to the quadrature modulation section 16.

As described above, the communication apparatus 2 according to the second embodiment of the present invention has the advantages described in the first embodiment, and in addition, is particularly useful in the case where circuit modification is not possible as the baseband modulation signal generation section and the modulation scheme switch are integrated in a single unit.

Note that in the present embodiment the power ratio switch is arranged immediately after the modulation scheme switch in the modulation scheme selection section. However, providing, for example, a D/A converter, a filter, a level conversion circuit, or the like between these switches falls within a normal range of design choices.

Third Embodiment

Figure 8:
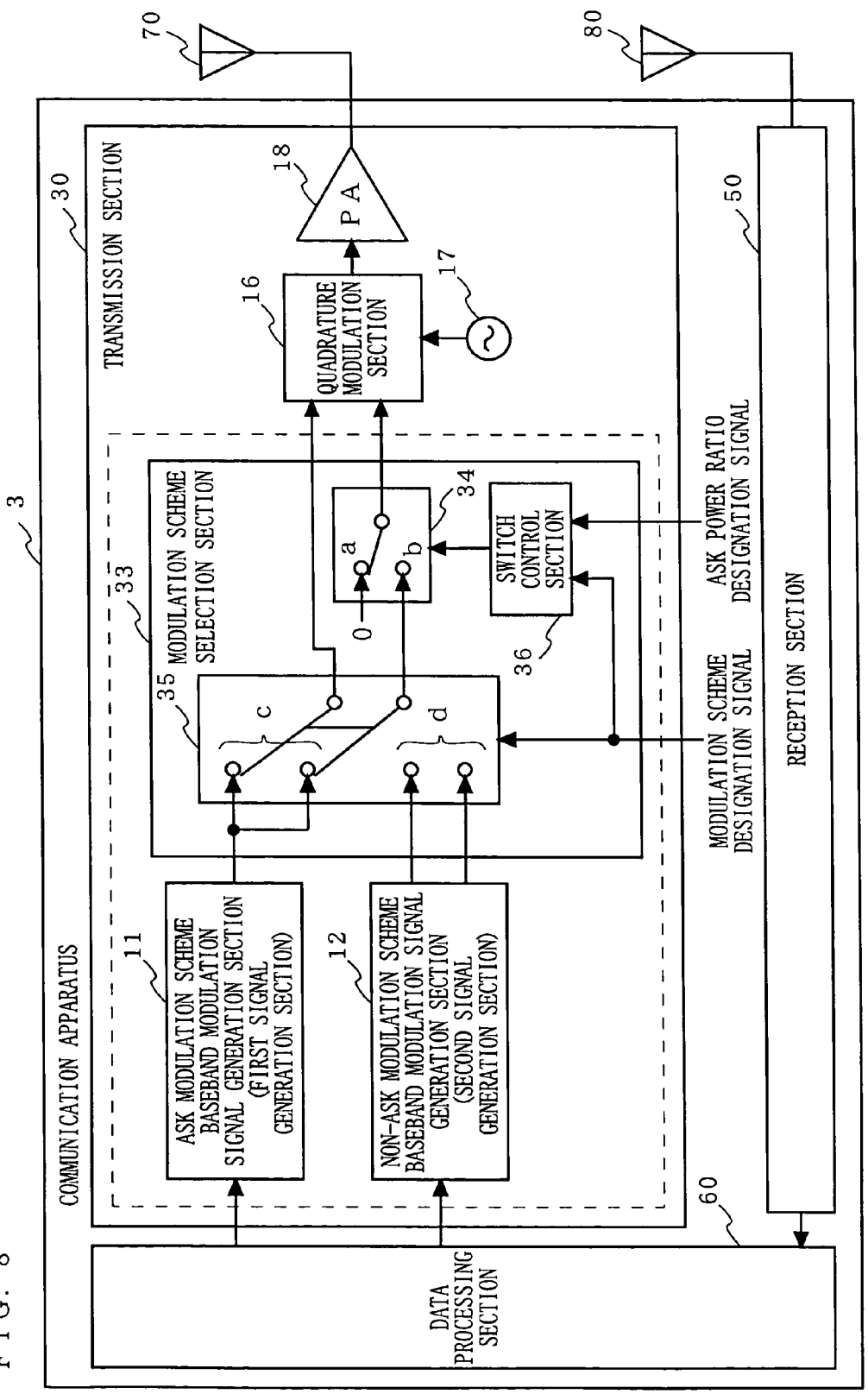
FIG. 8 is a block diagram showing a configuration of a communication apparatus 3 according to a third embodiment of the present invention.

FIG. 8 is a block diagram showing a configuration of a communication apparatus 3 according to a third embodiment of the present invention. In FIG. 8, the communication apparatus 3 according to the third embodiment includes a transmission section 30, a reception section 50, a data processing section 60, a transmission antenna 70, and a reception antenna 80. The transmission section 30 includes a first signal generation section 11, a second signal generation section 12, a modulation scheme selection section 33, a quadrature modulation section 16, a signal source 17, and a high-frequency power amplification section 18. The communication apparatus 3 according to the third embodiment differs from the communication apparatus 1 according to the foregoing first embodiment in the configuration of the modulation scheme selection section 33. The modulation scheme selection section 33 of a different configuration will be described below.

The modulation scheme selection section 33 includes a modulation scheme switch 35, a power ratio switch 34, and a switch control section 36. The modulation scheme switch 35 has two input terminals each having two terminals in a pair and one output terminal having two terminals in a pair, and controls the connection switching between the input terminals and the output terminal based on a modulation scheme designation signal. In the example of FIG. 8, a signal outputted from the ASK modulation scheme baseband modulation signal generation section 11 is branched and inputted as a pair of signals to an input terminal c. Signals in a pair outputted from the non-ASK modulation scheme baseband modulation signal generation section 12 are inputted to an input terminal d.

The switch control section 36 controls the connection switching of the power ratio switch 34 based on a modulation scheme designation signal and an ASK power ratio designation signal. The power ratio switch 34 has two input terminals and one output terminal, and controls the connection switching between the input terminals and the output terminal based on an instruction from the switch control section 36. In the example of FIG. 8, a signal having a value of 0 is inputted to an input terminal a, and one of the signals in a pair outputted from the modulation scheme switch 35 is inputted to an input terminal b.

The modulation scheme selection section 33 controls connection switching such that the modulation scheme switch 35 and the power ratio switch 34 perform connection switching according to the modulation scheme and transmission power ratio to be applied to transmission data, using the combinations shown in FIG. 9.

(1) In the case of performing non-ASK modulation, a modulation scheme designation signal designating a non-ASK modulation scheme is provided to the modulation scheme switch 35 and the switch control section 36. In response to this, the modulation scheme switch 35 switches the connection to the input terminal d and the output terminal, and the switch control section 36 controls the power ratio switch 34 to switch the connection to the input terminal b and the output terminal. By this switching, baseband modulation signals in a pair outputted from the non-ASK modulation scheme baseband modulation signal generation section 12 are outputted to the quadrature modulation section 16.

(2) In the case of performing ASK modulation such that the ratio of the transmission power in the ASK modulation scheme to the transmission power in the non-ASK modulation scheme is a factor of 1, an ASK power ratio designation signal designating an ASK power ratio of "1" is provided to the switch control section 36, and a modulation scheme designation signal designating the ASK modulation scheme is provided to the modulation scheme switch 35 and the switch control section 36. In response to this, the modulation scheme switch 35 switches the connection to the input terminal c and the output terminal, and the switch control section 36 controls the power ratio switch 34 to switch the connection to the input terminal a and the output terminal. By this switching, a single-axis baseband modulation signal outputted from the ASK modulation scheme baseband modulation signal generation section 11 and a signal having a value of 0 are outputted to the quadrature modulation section 16.

(3) In the case of performing ASK modulation such that the ratio of the transmission power in the ASK modulation scheme to the transmission power in the non-ASK modulation scheme is a factor of 2, an ASK power ratio designation signal designating an ASK power ratio of "2" is provided to the switch control section 36, and a modulation scheme designation signal designating the ASK modulation scheme is provided to the modulation scheme switch 35 and the switch control section 36. In response to this, the modulation scheme switch 35 switches the connection to the input terminal c and the output terminal, and the switch control section 36 controls the power ratio switch 34 to switch the connection to the input terminal b and the output terminal. By this switching, a pair of signals into which a single-axis baseband modulation signal outputted from the ASK modulation scheme baseband modulation signal generation section 11 is branched, is outputted to the quadrature modulation section 16.

As described above, the communication apparatus 3 according to the third embodiment of the present invention has the advantages described in the first embodiment, and in addition, is particularly useful in the case where circuit modification is not possible as the baseband modulation signal generation section and the modulation scheme switch are integrated in a single unit.

Note that in the present embodiment the power ratio switch is arranged immediately after the modulation scheme switch in the modulation scheme selection section. However, providing, for example, a D/A converter, a filter, a level conversion circuit, or the like between these switches falls within a normal range of design choices.

Fourth Embodiment

Figure 10:
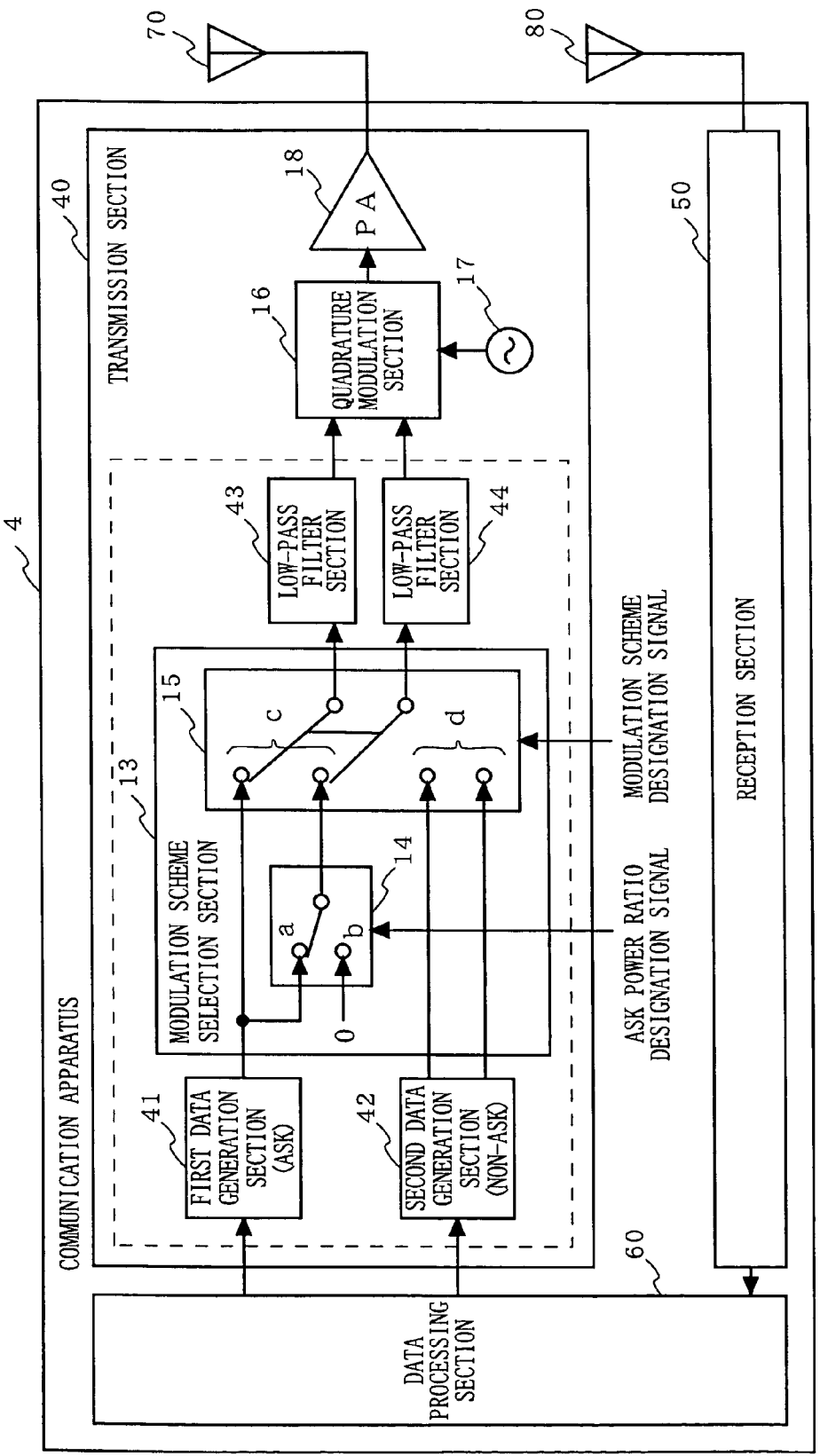
FIG. 10 is a block diagram showing a configuration of a communication apparatus 4 according to a fourth embodiment of the present invention.

FIG. 10 is a block diagram showing a configuration of a communication apparatus 4 according to a fourth embodiment of the present invention. In FIG. 10, the communication apparatus 4 according to the fourth embodiment includes a transmission section 40, a reception section 50, a data processing section 60, a transmission antenna 70, and a reception antenna 80. The transmission section 40 includes a first data generation section 41, a second data generation section 42, a modulation scheme selection section 13, low-pass filter sections 43 and 44, a quadrature modulation section 16, a signal source 17, and a high-frequency power amplification section 18. The communication apparatus 4 according to the fourth embodiment is configured such that the low-pass filter section 113 (see FIG. 2A) included in the first signal generation section 11 and the low-pass filter section 123 (see FIG. 2B) included in the second signal generation section 12 of the communication apparatus 1 according to the foregoing first embodiment are configured as a single unit. The first data generation section 41, the second data generation section 42, and the low-pass filter sections 43 and 44 will be described below.

In the example where the ASK modulation scheme is used, the first data generation section 41 serves as an ASK data generation section 41 and the second data generation section 42 serves as a non-ASK data generation section 42. The ASK data generation section 41 accepts, as input, transmission data from the data processing section 60 and generates a single-axis data based on the ASK modulation scheme. The non-ASK data generation section 42 generates two-axis data based on any modulation scheme other than the ASK modulation scheme. The low-pass filter sections 43 and 44 impose a band-limitation on signals outputted as a pair from the modulation scheme selection section 13, respectively, and output the resulting signals as baseband modulation signals. Since the low-pass filter sections 43 and 44 perform a linear operation, the ratio of data amplitude between the signals caused by a modulation scheme designation signal or an ASK power ratio designation signal is retained as the ratio of the amplitude of the baseband modulation signals to be inputted to the quadrature modulation section 16.

As described above, the communication apparatus 4 according to the fourth embodiment of the present invention can also be applied to the configuration of conventional communication apparatuses in which low-pass filter sections are configured as a single unit.

Note that although the fourth embodiment shows an example where the configuration of the first data generation section 41, the second data generation section 42, and the low-pass filter sections 43 and 44 is applied to the communication apparatus 1 according to the first embodiment, this configuration can also be similarly applied to the communication apparatuses 2 and 3 according to the second and third embodiments.

Now, a specific application example of the switches included in the modulation scheme selection sections 13 to 33 of the first to fourth embodiments will be described.

Generally, a communication apparatus modulates transmission data, which is digital information, into a high-frequency signal with an analog waveform and then transmits the signal. Therefore, it is desirable that the first half part of the communication apparatus be composed of a digital signal processing circuit and the second half part be composed of an analog signal processing circuit. However, since the border between the digital signal processing circuit and the analog signal processing circuit is left to the design, a switch may be used to handle a digital signal or an analog signal. Normally, in the case of handling digital signals, since the signals are represented by an arrangement of a plurality of bits, the number of terminals of the switch is large; on the other hand, in the case of handling analog signals, the number of terminals of the switch is small.

In view of this, a so-called "data selector" composed of a logical circuit may be used as the digital switch, and a so-called "analog switch" composed of an FET or the like may be used as the analog switch. Since these switches are composed of semiconductors, the integration of the switches into other circuits can be done easily. In particular, in the case where the switch connection is fixed during the operation of the communication apparatus (e.g., in the case where the ASK power ratio does not change during operation), a mechanical switch may be used as the analog switch; for example, a DIP switch. Alternatively, switching may be done by changing, according to an ASK power ratio designation, the wiring pattern of a printed circuit used in the transmission apparatus. In this case, the ASK power ratio designation used to control the switch corresponds to the design data such as a wiring diagram. As the digital switch, a mechanical switch may be used as in the case of the analog switch. Note, however, that since the number of terminals is large and thus the mounting area becomes large, it is recommended that a mechanical switch be used only in the case where there is an abundance of room in the communication apparatus.

Now, the case is described where a BPSK modulation scheme is used in place of the ASK modulation scheme described in the foregoing first to fourth embodiments. In the case of the BPSK modulation scheme, generally, the transmission power is defined as an average value as in the case of modulation schemes other than the BPSK modulation scheme. However, since the influence of nonlinear distortion on transmission error differs between a modulation scheme, such as BPSK, in which the distance between signal points is large and a non-BPSK modulation scheme, the transmission power to be outputted from the high-frequency power amplification section differs between these schemes. As such, in the case of the BPSK modulation scheme, too, there may be plural types of communication apparatuses having different transmission powers, and therefore the same problem as in the ASK modulation scheme arises.

Figure 11:
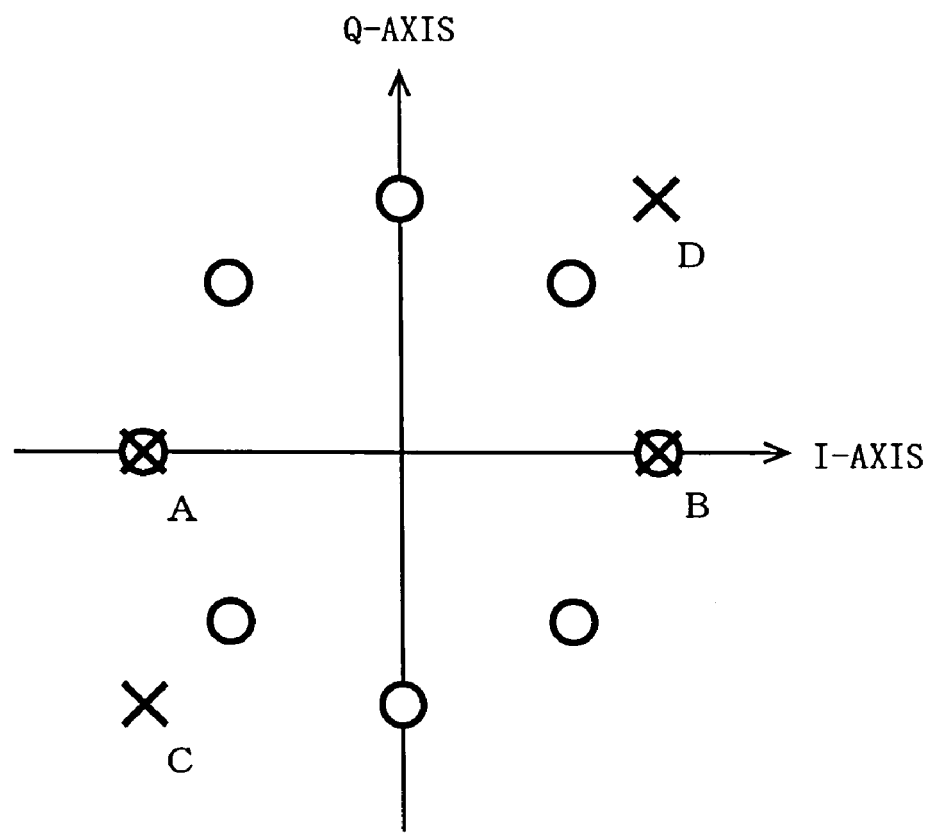
FIG. 11 is a signal space diagram for quadrature modulation (BPSK and QPSK modulation schemes)
Figure 12:
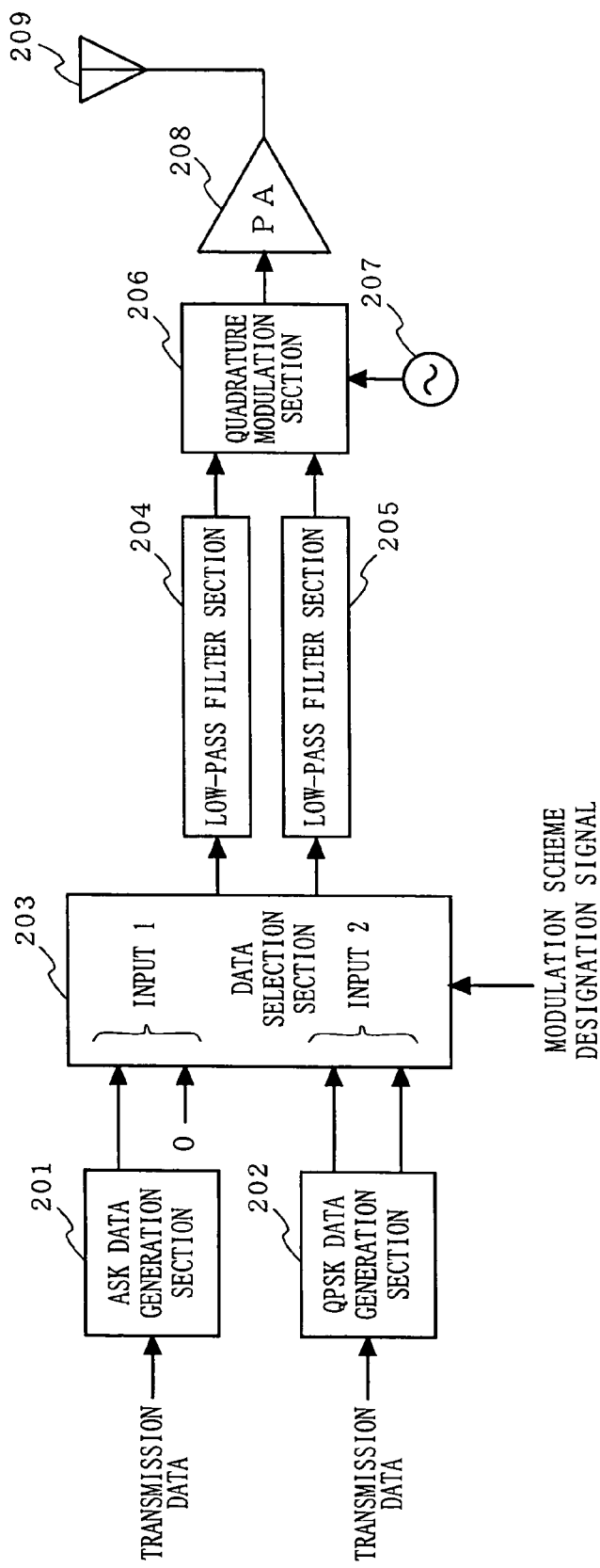
FIG. 12 is a block diagram showing a configuration of a conventional communication apparatus.

In the BPSK modulation scheme, as in the case of the ASK modulation scheme, the signal can be represented by a single-axis baseband modulation signal, and thus a communication apparatus can be realized with the same configuration as that of the first to fourth embodiments. An exemplary signal space diagram for quadrature modulation is shown in FIG. 11. In FIG. 11, the points indicated by the symbol "○" represent the signal points of QPSK and the points indicated by the symbol "X" represent the signal points of BPSK. When the BPSK power ratio designation is "1", since the I-axis input is a BPSK modulation scheme baseband modulation signal and the Q-axis input is a signal having a value of 0, the signal points of BPSK are the points indicated by the symbol "X" of A and the symbol "X" of B. On the other hand, when the BPSK power ratio designation is "2", since both the I-axis input and the Q-axis input are a single BPSK modulation scheme baseband modulation signal, the signal points of BPSK are the points indicated by the symbol "X" of C and the symbol "X" of D. Comparing with the average amplitude of QPSK modulation (as indicated by the symbol "○"), the average amplitude of BPSK modulation (as indicated by the symbol "X") is higher by a factor of 1 when the BPSK power ratio designation is "1", and by a factor of $\sqrt{2}$ when the BPSK power ratio designation is "2".

Note that the functional block of each of the first signal generation section 11, the second signal generation section 12, and the modulation scheme selection sections 13 to 33 of the present invention is typically realized in the form of an LSI, an integrated circuit, which may be called an IC, a system LSI, a super LSI, an ultra LSI, or the like, depending on the degree of integration (see the broken line in FIG. 1). The functional blocks may be individually integrated in one chip, or part or all of the functional blocks may be integrated in one chip.

The method of realizing an integrated circuit is not limited to an LSI; and the integrated circuit may be realized using a dedicated circuit or general processor. Alternatively, it is also possible to use an FPGA (Field Programmable Gate Array) which can be programmed after the fabrication of the LSI, or a reconfigurable processor which enables the reconfiguration of the connections or settings of circuit cells in the LSI.

Further, with the advancement of semiconductor technologies or other technologies derived therefrom, if integrated circuit technologies which replace LSIs emerge, as a matter of course, functional blocks may be integrated using such technologies. The applications of biotechnologies, etc., are possible cases.

While the invention has been described in detail, the foregoing description is in all aspects illustrative and not restrictive. It is understood that numerous other modifications and variations can be devised without departing from the scope of the invention.

What is claimed is:

1. A communication apparatus for performing data communication by selectively using a single-axis modulation scheme and a two-axis modulation scheme, the communication apparatus comprising:
   a reception section operable to perform a predetermined reception process on reception data;
   a data processing section operable to accept as input the reception data from the reception section, perform a predetermined process on the reception data, and output transmission data resulting from the predetermined process; and
   a transmission section operable to perform a predetermined transmission process on the transmission data outputted from the data processing section, and output a high-frequency signal, wherein
   the transmission section includes:

a first signal generation section operable to generate a single-axis baseband modulation signal for the single-axis modulation scheme;

a second signal generation section operable to generate a pair of baseband modulation signals for the two-axis modulation scheme;

a modulation scheme selection section operable to, when two-axis modulation is performed, select the pair of baseband modulation signals generated by the second signal generation section, when single-axis modulation is performed and a ratio of transmission power in the single-axis modulation scheme to transmission power in the two-axis modulation scheme has a given value, select a pair of signals including the single-axis baseband modulation signal generated by the first signal generation section and a signal having a fixed value, and when single-axis modulation is performed and the transmission power ratio is double the given value, select a pair of signals into which the single-axis baseband modulation signal generated by the first signal generation section is branched;

a quadrature modulation section operable to perform a frequency conversion on a pair of signals selected by the modulation scheme selection section, and output a modulated high-frequency signal; and a high-frequency power amplification section operable to amplify the modulated high-frequency signal outputted by the quadrature modulation section, and transmit a resulting signal from an antenna.

2. The communication apparatus according to claim 1, wherein the modulation scheme selection section includes:

a power ratio switch for accepting as input the single-axis baseband modulation signal generated by the first signal generation section and the signal having the fixed value, and outputting one of the single-axis baseband modulation signal and the signal having the fixed value based on a predetermined power ratio designation signal; and a modulation scheme switch for accepting as input the pair of signals including the single-axis baseband modulation signal generated by the first signal generation section and a signal outputted from the power ratio switch as a first pair of signals, and the pair of baseband modulation signals generated by the second signal generation section as a second pair of signals, and outputting one of the first and second pairs of signals based on a predetermined modulation scheme designation signal.

3. The communication apparatus according to claim 1, wherein the modulation scheme selection section includes:

a modulation scheme switch for accepting as input the pair of signals including the single-axis baseband modulation signal generated by the first signal generation section and the signal having the fixed value as a first pair of signals, and the pair of baseband modulation signals generated by the second signal generation section as a second pair of signals, and outputting one of the first and second pairs of signals based on a predetermined modulation scheme designation signal; and a power ratio switch for accepting as input the one of the first and second pairs of signals outputted from the modulation scheme switch, and outputting, when performing the single-axis modulation, either the inputted pair of signals or a pair of signals into which the single-axis baseband modulation signal included in the inputted pair of signals is branched, according to a predetermined power ratio designation signal.

4. The communication apparatus according to claim 1, wherein the modulation scheme selection section includes:

a modulation scheme switch for accepting as input the pair of signals into which the single-axis baseband modulation signal generated by the first signal generation section is branched as a first pair of signals, and the pair of baseband modulation signals generated by the second signal generation section as a second pair of signals, and outputting one of the first and second pairs of signals based on a predetermined modulation scheme designation signal; and a power ratio switch for accepting as input the one of the first and second pairs of signals outputted from the modulation scheme switch, and outputting, when performing the single-axis modulation, either the inputted pair of signals or a pair of signals including the signal having the fixed value.

5. A transmission apparatus for performing data transmission by selectively using a single-axis modulation scheme, and a two-axis modulation scheme, the transmission apparatus comprising:

a first signal generation section operable to generate a single-axis baseband modulation signal for the signal-axis modulation scheme;

a second signal generation section operable to generate a pair of baseband modulation signals for the two-axis modulation scheme;

a modulation scheme selection section operable to, when two-axis modulation is performed, select the pair of baseband modulation signals generated by the second signal generation section, when single-axis modulation is performed and a ratio of transmission power in the single-axis modulation scheme to transmission power in the two-axis modulation scheme has a given value, select a pair of signals including the single-axis baseband modulation signal generated by the first signal generation section and a signal having a fixed value, and when single-axis modulation is performed and the transmission power ratio is double the given value, select a pair of signals into which the single-axis baseband modulation signal generated by the first signal generation section is branched;

a quadrature modulation section operable to perform a frequency conversion on a pair of signals selected by the modulation scheme selection section, and output a modulated high-frequency signal; and a high-frequency power amplification section operable to amplify the modulated high-frequency signal outputted by the quadrature modulation section, and transmit a resulting signal from an antenna.

6. The transmission apparatus according to claim 5, wherein the modulation scheme selection section includes:

a power ratio switch for accepting as input the single-axis baseband modulation signal generated by the first signal generation section and the signal having the fixed value, and outputting one of the single-axis baseband modulation signal and the signal having the fixed value based on a predetermined power ratio designation signal; and a modulation scheme switch for accepting as input the pair of signals including the single-axis baseband modulation signal generated by the first signal generation section and a signal outputted from the power ratio switch as a first pair of signals, and the pair of baseband modulation signals generated by the second signal generation section as a second pair of signals, and outputting one of the first and second pairs of signals based on a predetermined modulation scheme designation signal.

7. The transmission apparatus according to claim 5, wherein the modulation scheme selection section includes:
a modulation scheme switch for accepting as input the pair of signals including the single-axis baseband modulation signal generated by the first signal generation section and the signal having the fixed value as a first pair of signals, and the pair of baseband modulation signals generated by the second signal generation section as a second pair of signals, and outputting one of the first and second pairs of signals based on a predetermined modulation scheme designation signal; and
a power ratio switch for accepting as input the one of the first and second pairs of signals outputted from the modulation scheme switch, and outputting, when performing the single-axis modulation, either the inputted pair of signals or a pair of signals into which the single-axis baseband modulation signal included in the inputted pair of signals is branched, according to a predetermined power ratio designation signal.

8. The transmission apparatus according to claim 5, wherein the modulation scheme selection section includes:
a modulation scheme switch for accepting as input the pair of signals into which the single-axis baseband modulation signal generated by the first signal generation section is branched as a first pair of signals, and the pair of baseband modulation signals generated by the second signal generation section as a second pair of signals, and outputting one of the first and second pairs of signals based on a predetermined modulation scheme designation signal; and
a power ratio switch for accepting as input the one of the first and second pairs of signals outputted from the modulation scheme switch, and outputting, when performing the single-axis modulation, either the inputted pair of signals or a pair of signals including the signal having the fixed value.

9. An integrated circuit used in a transmission apparatus for performing data transmission by selectively using a single-axis modulation scheme, and a two-axis modulation scheme, wherein
the integrated circuit is mounted within the transmission apparatus including a quadrature modulation section and a high-frequency power amplification section, the quadrature modulation section operable to perform a frequency conversion on a pair of baseband modulation signals and output a modulated high-frequency signal, the high-frequency power amplification section operable to amplify the high-frequency signal modulated by the quadrature modulation section and transmit the resulting signal from an antenna, and
the integrated circuit integrates thereon circuits functioning as:
a first signal generation section operable to generate a single-axis baseband modulation signal for the single-axis modulation scheme;
a second signal generation section operable to generate a pair of baseband modulation signals for the two-axis modulation scheme; and
a modulation scheme selection section operable to,
when two-axis modulation is performed, select the pair of baseband modulation signals generated by the second signal generation section,
when single-axis modulation is performed and a ratio of transmission power in the single-axis modulation scheme to transmission power in the two-axis modulation scheme has a given value, select a pair of signals including the single-axis baseband modulation signal generated by the first signal generation section and a signal having a fixed value,
when single-axis modulation is performed and the transmission power ratio is double the given value, select a pair of signals into which the single-axis baseband modulation signal generated by the first signal generation section is branched.

10. A method of transmitting data by selectively using a single-axis modulation scheme, and a two-axis modulation scheme, the method comprising:
a first signal generation step of generating a single-axis baseband modulation signal for the single-axis modulation scheme;
a second signal generation step of generating a pair of baseband modulation signals for the two-axis modulation scheme; and
a selection step of,
when two-axis modulation is performed, selecting the pair of baseband modulation signals generated in the second signal generation step
when single-axis modulation is performed and a ratio of transmission power in the single-axis modulation scheme to transmission power in the two-axis scheme has a given value, selecting a pair of signals including the single-axis baseband modulation signal generated in the first signal generation step and a signal having a fixed value, and
when a single-axis modulation is performed and the transmission power ratio is double the given value, selecting a pair of signals into which the single-axis baseband modulation signal generated in the first signal generation step is branched.

11. The transmission method according to claim 10, further comprising:
a quadrature modulation step of performing a frequency conversion on the pair of signals selected in the selection step, and outputting a modulated high-frequency signal; and
an amplification step of amplifying the modulated high-frequency signal outputted in the quadrature modulation step, and transmitting a resulting signal from an antenna.

* * * * *